June 13, 1967     N. F. FYLER     3,325,777
IMAGE FORMING APPARATUS
Filed Aug. 26, 1964     3 Sheets-Sheet 1
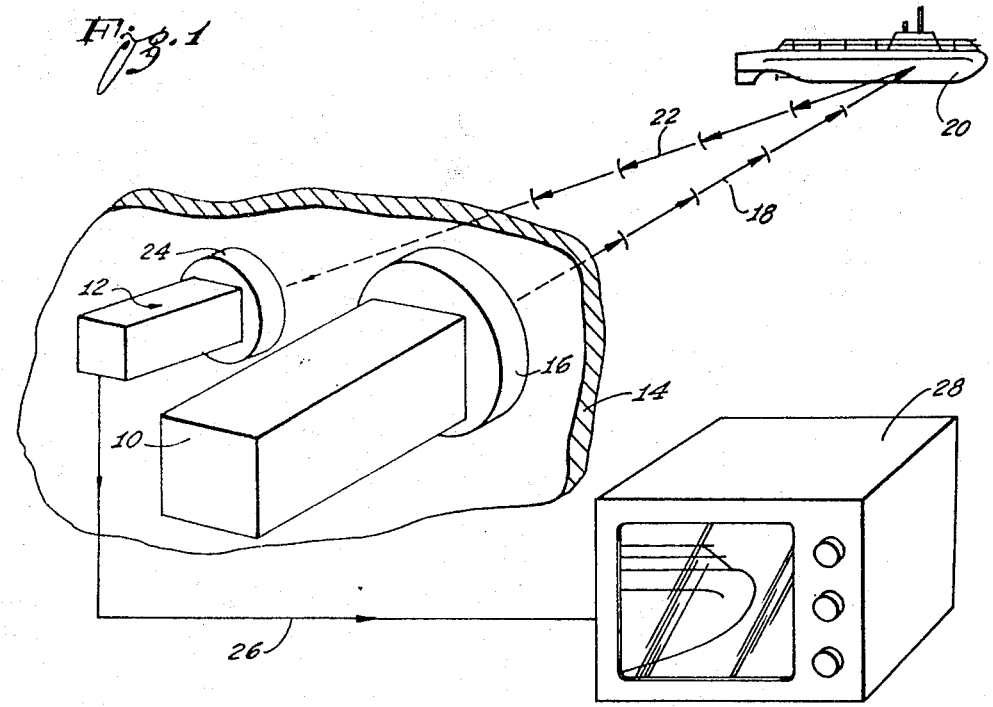
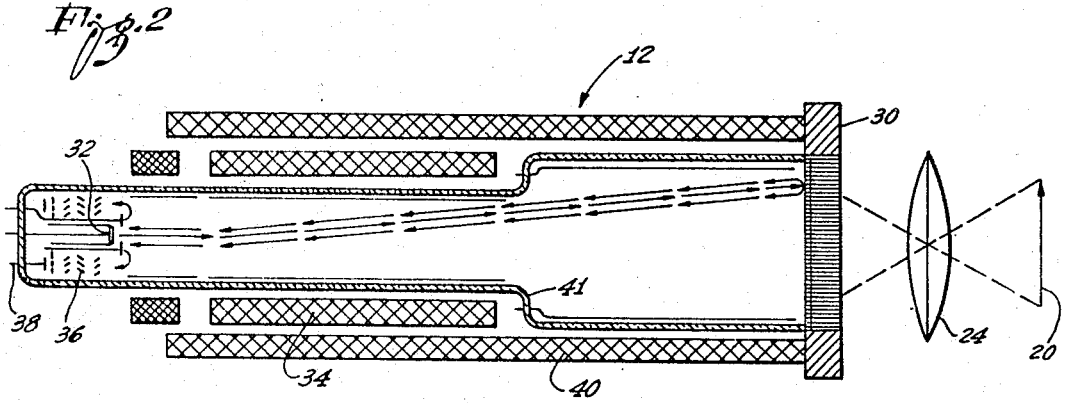
INVENTOR:
Norman F. Fyler
Attorney

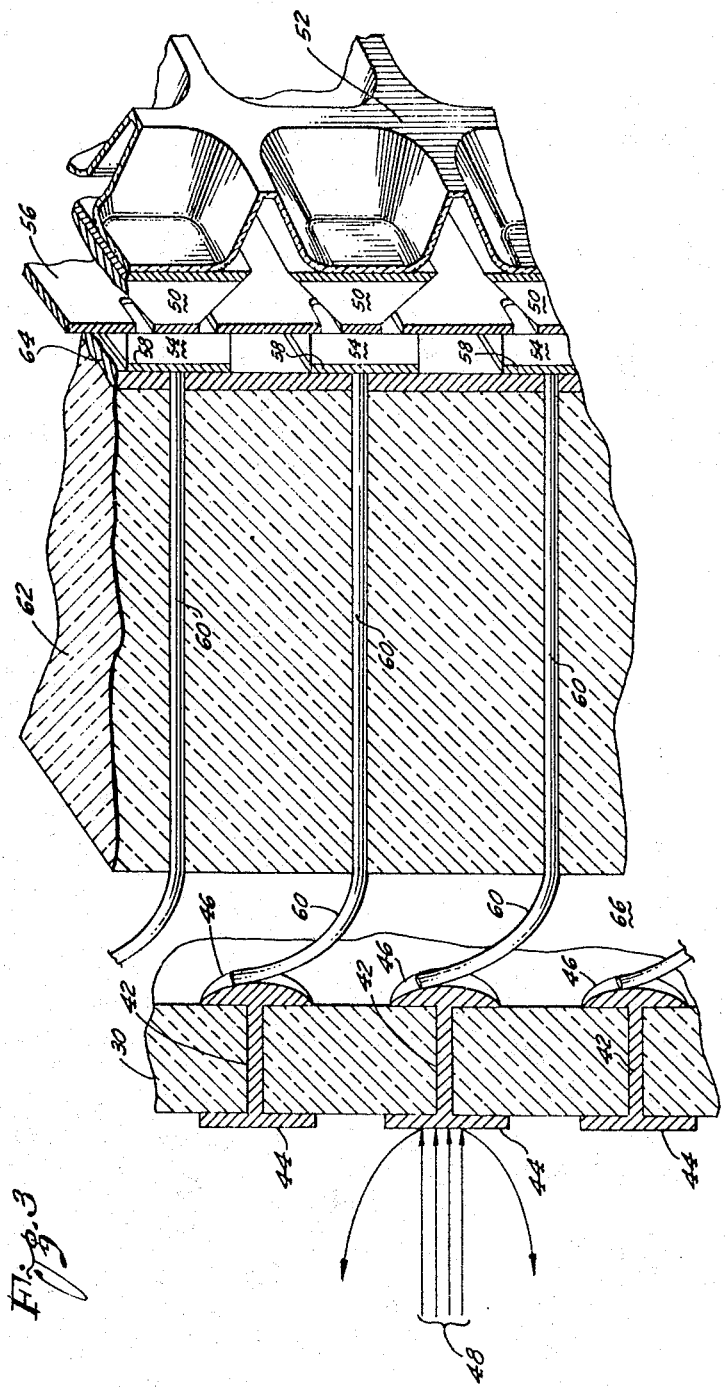

United States Patent Office 3,325,777
Patented June 13, 1967

3,325,777
IMAGE FORMING APPARATUS
Norman F. Fyler, Menlo Park, Calif., assignor to Litton Precision Products, Inc., San Carlos, Calif.
Filed Aug. 26, 1964, Ser. No. 392,224
15 Claims. (Cl. 340—3)

This invention relates to an image display system and more particularly to a system for providing a visual display of a visible or invisible field pattern.

For the purpose of this invention, a field may be considered to be the description of the assumed physical properties of a region under some external influence, for example an electromagnetic wave such as light, compressional wave such as an ultrasonic wave, or of subatomic particles such as X-rays. By way of example but not of limitation, other field patterns within the meaning of the invention includes heat fields such as infrared radiation, electric fields and magnetic fields.

It is frequently desirable to provide a visual representation or image of field patterns such as those mentioned above, but in the case of field patterns which are not inherently visible to the human eye, which field patterns include all of the above mentioned patterns except light patterns, it is frequently difficult, if not impossible, to provide instantaneous visual representations of the field patterns or even to provide visual representations at all, except through drawings.

An example of an area in which those skilled in the art have been trying for many years to obtain a suitable system for presenting the visual display of such field patterns is in the sonic or ultrasonic field areas. For many years attempts have been made to develop underwater "viewing" systems in which a radar-like system is provided which includes a transmitter of sonic or ultrasonic compressional waves and a receiver responsive to the reflected compressional waves for presenting a visual display of the objects reflecting the compressional wave energy. The audio equivalent of such systems is, of course, the well known sonar listening system.

There are several reasons why an underwater "viewing" system utilizing ultrasonic wave energy is superior to one utilizing visual light. One of these is that the range of the ultrasonic system is considerably greater than that of the visual system because even in clear water, microscopic objects suspended in the water scatter light to such an extent that even under the most favorable conditions, visibility is limited to only a few hundred feet. Increasing the intensity of the light source has relatively little effect on the range since the adverse phenomena is one of scattering instead of one of attenuation. If an ultrasonic wave is utilized rather than a light wave, the energy may be absorbed by the microscopic particles but is not scattered since the wave length of the ultrasonic wave is orders of magnitude larger than that of the light wave and is thus many times larger than the microscopic particles. Accordingly, the range can be increased by merely increasing the intensity of the ultrasonic source. Another range limiting factor affecting visual light systems is that murky water is frequently encountered, especially near the bottom of large bodies of water, such as the oceans, where there is an accumulation of large amounts of silt which may be agitated by the passage of underwater vehicles, such as submarines, nearby. Again, if ultrasonic wave systems were being used, the silt might increase the attenuation of the ultrasonic wave, but this can be compensated for at least to a certain extent by increasing the intensity of the ultrasonic wave source.

A number of systems have been proposed in the prior art which utilize reflected ultrasonic wave energy to provide a visual display of the underwater objects reflecting the energy. Usually these systems have utilized a mosaic of detectors such as microphones to convert the ultrasonic wave energy into electrical signals of corresponding intensity and the detector elements are scanned to provide a video signal which may be displayed on a conventional cathode ray tube. The shortcomings in these prior art systems have usually been in their means for scanning the mosaic of detector elements to obtain the video signal. For example, in U.S. Patent 2,528,725, a second cathode ray tube is used for the pickup device, with the reflected ultrasonic wave impinging upon a mosaic of crystal elements in the face plate of the pickup cathode ray tube, thereby setting up a voltage pattern on the interior surface of the face plate which may be read by scanning the interior surface of the face plate with the electron beam of the tube. A similar arrangement using electromagnetic waves in air is shown in U.S. Patent 2,571,163. Also, in U.S. Patents 2,453,502 and 3,067,281 the scanning has been effected by mechanical means which sequentially connect the microphones of the detector's mosaic into a suitable electronic circuit to thereby generate the time base video signal. However, none of these prior art systems have proven satisfactory and no successful underwater ultrasonic viewing systems have been produced.

It is accordingly an object of the present invention to provide an improved system for presenting a visual display of a field pattern.

It is another object of the present invention to provide an improved underwater ultrasonic viewing system.

It is still another object of the present invention to provide a system which can, with only slight modifications, present a visual indication of any form of field pattern.

It is a specific object of the present invention to provide an improved means for converting a field pattern into a time base video signal.

Briefly stated, and in accordance with one embodiment of the present invention, a system for presenting a visual display of a field pattern, such as a reflected ultrasonic wave, is provided which includes a cathode ray tube having a face plate which has a mosaic of conductive elements extending through the face plate such as that each of the conductive elements has an interior end inside of the cathode ray tube and an exterior end outside of the cathode ray tube. Further means are provided for impressing upon the exterior portions of the conductive elements a voltage pattern indicative of the field patterns for which the visual display is desired. For example, the voltage pattern indicative of the field pattern may be provided by a corresponding mosaic of detector elements each responsive to the intensity of the field pattern at the point where it is located, with each of the detector elements being connected to a respective corresponding conductive element in the face plate of the cathode ray tube. Thus, when each of the detector elements generates a voltage signal of corresponding intensity to the intensity of the field pattern to which the detector is subject, a voltage pattern corresponding to the field pattern is thereby impressed upon the exterior ends of the conductors extending through the face plate of the cathode ray tube. The interior ends of the conductors are then swept by the electron beam in the cathode ray tube and a time base video signal may thereby be generated in a conventional manner. The video signal may then be applied to a convention monitor unit to provide an instantaneous visual representation of the field pattern impinging upon the detector elements.

For a complete understanding of the invention, together with other objects and advantages thereof, reference may be made to the accompanying drawings, in which:

FIGURE 1 is a schematic representation of an underwater ultrasonic viewing system in accordance with the present invention;

FIGURE 2 is a cross sectional view of a camera tube used in the system of FIGURE 1 which embodies portions of the present invention;

FIGURE 3 is a sectional perspective view of a portion of the face plate of the camera tube of FIGURE 2;

Figure 4:
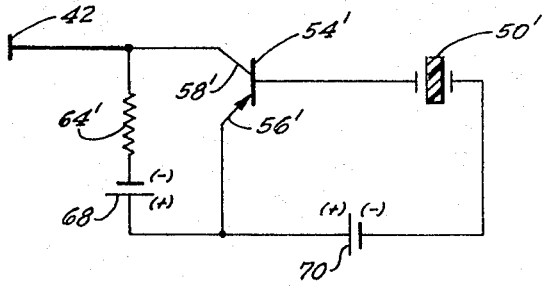
FIGURE 4 is an equivalent circuit diagram of the elements of FIGURE 3.

FIGURE 1 shows a schematic representation of an underwater viewing system incorporating the present invention. The system includes an undewater transmitter 10 and a transducer-camera 12 which responds to reflected ultrasonic wave energy from transmitter 10 to provide a video signal indicative of the object or objects reflecting the ultrasonic wave energy. The frequency of the ultrasonic wave is not critical, and any frequency for which suitable generators and detectors exist may be used. The transmitter 10 and camera 12 may conveniently be mounted in the hull 14 of a vehicle such as a submarine which is carrying the system. Ultrasonic wave energy from the transmitter 10 may be directed by a conventional launcher 16 into a transmitted beam 18 of ultrasonic wave energy. Transmitter 10 and launcher 16 may be of the type well known to those skilled in the art, such as are utilized in conventional sonar systems. Launcher 16 may provide a narrow columnated beam if it is desired to view objects at a considerable distance, with a resulting relatively narrow field of view, or may provide a wide scattering of the transmitted beam if it is desired to attain a wide field of view of objects relatively close to the transmitter. Such transmitters and launchers are well known to those skilled in the art and in themselves form no part of the present invention. Accordingly, further details of the construction of transmitter 10 and launcher 16 will not be given.

The transmitted ultrasonic beam 18 may strike an underwater object 20, such as a submarine, and a portion is reflected in a beam 22 which is indicative of the characteristics of object 20. The reflected beam 22 is focused onto camera 12 by a liquid lens 24, which may be formed from a balloon-like membrane filled with a fluid such as carbon tetrachloride in which the velocity of an elastic wave is sufficiently different from that in water to provide suitable focusing. Alternatively, any suitable focusing means may be utilized instead. Camera 12, which will also later be described in detail, provides a video signal indicative of reflected beam 22, which video signal is applied through conductor 26 to a conventional television type monitor 28 to provide a visual representation of object 20.

FIGURE 2 shows a cross sectional view of a camera tube 12 embodying the present invention which may be used in the system shown in FIGURE 1. Camera tube 12 includes a face plate 30 which has a mosaic of conductive elements extending completely through the face plate, thus each having one end on the interior side of face plate 30 and the other end on the exterior side of face plate 30. Reflected ultrasonic wave energy from the object 20 is focused by lens 24 onto the exterior side of face plate 30, and, as will later be described in detail, a charge pattern is generated on the exterior side of face plate 30 which is indicative of the reflected ultrasonic wave energy and, thus, of object 20. This charge pattern is, of course, also present on the interior ends of the mosaic of conductive elements embedded in face plate 30 and thus also appears on the interior surface of face plate 30. An electron gun 32 generates an electron beam which may be deflected by a magnetic yoke 34 to scan the interior surface of face plate 30. The electron beam approaches the interior surface of face plate 30 and either lands thereon or is repelled, depending upon the charge pattern existing at the particular point the electron beam approaches.

The landing beam strikes the interior ends of the conductive elements embedded in face plate 30 and causes secondary emissions of electrons therefrom. These electrons, together with repelled electrons from the beam, return to the electron gun end of the camera tube 12 where they are collected in an electron multiplier 36 from whose output 38 the video signal is obtained. A focus coil 40 provides an axial magnetic field for maintaining the electron beam in focus both as it traverses from the electron gun 32 to face plate 30 and as it returns from face plate 30 to electron multiplier 36.

Those skilled in the art will recognize that once the charge pattern is established on the interior surface of face plate 30, the scanning action and the means for generating the video signal are similar to those used in a conventional image orthicon television pickup tube.

Camera tube 12 also includes the conventional conductive wall coating 41 which is typically found in most cathode ray tubes. In conventional image orthicon television pickup tubes the conductive wall coating 41 is operated at a relatively high positive voltage, typically 200 volts. It has been found that increased sensitvity of the camera tube 12 of the present invention can be obtained if the conductive wall coating 41 is instead operated at a relatively low positive voltage, such as 10 to 20 volts. As is well known to those skilled in the art, this lower wall voltage results in a lower velocity of the electron beam and it has been observed that increased sensitivity can be obtained if the charge pattern on the interior surface of face plate 30 is scanned with a low velocity electron beam.

FIGURE 3 shows a sectional perspective view of a portion of face plate 30 of camera tube 12 and shows details of how the reflected ultrasonic wave is converted into a corresponding charge pattern. Face plate 30 has embedded therein a plurality of conductive elements 42 which may be conveniently arranged into a rectangular mosaic. Each conductive element 42 includes a head portion 44 on the interior side of face plate 30 and another head portion 46 on the exterior side of face plate 30. It is desirable, though not absolutely necessary, that the interior portion 44 of each conductive element 42 be of such geometric pattern that the electron beam 48 is presented with the greatest possible ratio of the area of the heads 44 to the exposed face plate 30. Thus, in the preferred embodiments of the invention, heads 44 are either triangular, rectangular, or hexagon shaped.

A corresponding mosaic of detector element 50 is provided in which the detectors serve as transducers for converting the ultrasonic wave into a plurality of electrical signals whose intensity corresponds to the intensity of the ultrasonic wave at the position of each detector. The detectors 50 in this shown embodiment may be pyramid shaped piezoelectric crystals, with each of the detectors 50 corresponding to a respective conductive element 42. The base of each of the detectors 50 is in electrical and mechanical contact with an outer membrane 52, which may conveniently be constructed from a thin sheet of stainless steel formed into an egg-carton pattern, as shown in FIGURE 3, to focus the ultrasonic wave energy onto the bases of detectors 50. The narrow end of each of the detectors 50 is in electrical contact with the base electrode of a corresponding transistor 54. A sheet of conductive material 56 electrically connects the emitter electrodes of each of the transistors 54, which conductor 56 may be electrically connected to outer membrane 52. The collector electrode 58 of each transistor 54 is electrically connected by a conductive lead 60 to the external head 46 of the corresponding conductive element 42 embedded in face plate 30. Leads 60 may be embedded in a block 62 of insulative material. A resistive coating 64 is provided between block 62 and collectors 58. Also, a stress yield space may be provided between block 62 and face plate 30. However, it is obvious that if it is desired, leads 60 may be directly connected to conductive elements 46 or may even be extensions of conductive elements 42.

There are several advantages in making the detectors 50 pyramid shaped, as shown in FIGURE 3. First, it is desirable to intercept the greatest possible amount of ultrasonic wave energy, not only because of the added efficiency but also because of the added resolution of the resultant picture. Thus, this requirement dictates that as large an area as possible of detector elements be exposed to the wave. However, if closely spaced cubicle detector elements were used, the resultant capacitive coupling between adjacent detectors would adversely affect the sensitivity of the system. This detrimental result is avoided by using the truncated pyramid shaped detectors 50. Also, the small ends of the pyramids allow convenient coupling to the transistors at the point of highest electrical potential in the detector elements.

It is also desirable that the static pressure on all sides of detector elements 50 be equalized in order that the detectors will be compressed only by the ultrasonic wave energy and not by static sea pressure. Thus the interstitial volume between membrane 52 and ceramic block 62 may be filled with an insulative fluid which is maintained at the same pressure as the external sea pressure.

FIGURE 4 shows a schematic circuit diagram of a single one of the detector elements 50 and illustrates how the charge on each conductive element 42 represents the intensity of the ultrasonic wave at the corresponding detector 50. As shown in FIGURE 4, each detector 50' is connected to the base electrode of a transistor 54' whose collector 58' is connected to its corresponding conductive element 42. A load resistance 64' is also connected to the collector of electrode 58'. Suitable DC source 68 and 70 (not shown in FIGURE 3) bias the transistor 54' to the point in its operating characteristic such that the output at collector electrode 58' is an amplified and rectified representation of the magnitude of the AC signal applied to its base electrode. Specifically, this AC signal is the output of detector 50' and the intensity of this AC signal is a function of the intensity of the ultrasonic wave to which detector 50' is subjected. Thus, a charge is impressed on conductive element 42 which is a function of the intensity of the ultrasonic wave which impinges upon detector 50'.

Figure 5:
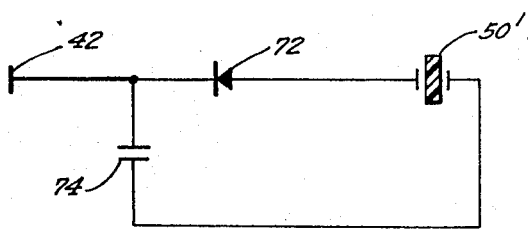
FIGURE 5 is an equivalent circuit diagram of a simplified arrangement of the invention which may be used.

FIGURE 5 shows a schematic circuit design of a simplified arrangement which may be used if no amplification of the signal is required. Detector 50' is connected to the anode of a diode 72 and a capacitance 74 is connected between the cathode of diode 72 and the other electrical terminal of detector 50'. Conductive element 42 is electrically connected to the junction of diode 72 and capacitance 74. The circuit thus serves as a simple peak detector of the output of detector 50'. In practice, there will be applications in which a separate capacitance 74 need not be provided but instead, this capacitance may be provided by the interelectrode capacitance of the mosiac of conductive elements 42.

At this point it may be useful to summarize the operation of the present invention and point out particular advantages gained through utilization of the invention. In the disclosed embodiment the impinging ultrasonic wave is converted into an alternating electrical signal whose frequency is the same as that of the ultrasonic wave and whose intensity is a function of the intensity of the wave at the location of the transducer. The high figure of merit, or Q, of the piezoelectric crystals used in the disclosed embodiment provides what may be termed a passive electrical gain of the signal approximately equal to the value of the Q of the crystal, which may be typically several thousand. The signal is then applied to either a transistor or a diode and rectification, and further amplification, if desired, is provided. The output of the transistor or diode is applied directly through the face plate of the tube to provide a quantized charge pattern on the interior surface of the face plate. Thus the degree of resolution desired may be effected by proper design choice simply by selecting the number of conductive elements in the mosaic extending through the face plate and selecting a corresponding number of transducers in the detector mosaic. The resulting charge pattern on the interior surface may also be stored there for relatively long periods of time due to the interelectrode capacitance between the conductive elements. Thus the scan rate of the system can be selected at any desired value and the charge pattern will remain in storage between scan cycles.

At this point it may be noted that for the polarities shown in FIGURES 4 and 5, a positive voltage pattern is impressed upon the mosaic of conductive elements 42. When the electron beam scans this positive voltage pattern, a portion of the beam remains on the conductive elements to neutralize the voltage pattern and the remainder of the current in the electron beam returns to the electron multiplier 36 to provide the video signal. If the polarities of the transistor 58' or diode 72' are reversed, a negative voltage pattern is impressed upon conductive elements 42. As was previously discussed, a low velocity electron beam is advantageously used to scan the conductive elements 42. The entire electron beam current is then repelled by the negative charges and then returned to the electron gun end of the cathode ray tube. Proper shielding may be placed around electron multiplier 36 to collect only those electrons whose path has not been disturbed by a negative electric field at face plate 30, thereby only allowing those electrons so disturbed to enter the electron multiplier 36 to provide an output signal. The advantage of this mode of operation is that the electron beam does not destroy the charge pattern. The charge pattern may instead remain indefinitely upon the mosaic of conductive elements 42 and be repeatedly scanned by the electron beam as desired, even though no additional signal is provided from the mosiac of detector elements 50. Given the present state of the art of rectifier and high resistivity of glass, the charge pattern may remain readable for as long as several days. When it is desired to erase the pattern to allow a new one to be impressed upon the mosaic of conductive elements 42, it is only necessary to increase the wall voltage and scan the mosaic with a high velocity, or "hard," electron beam.

Figure 6:
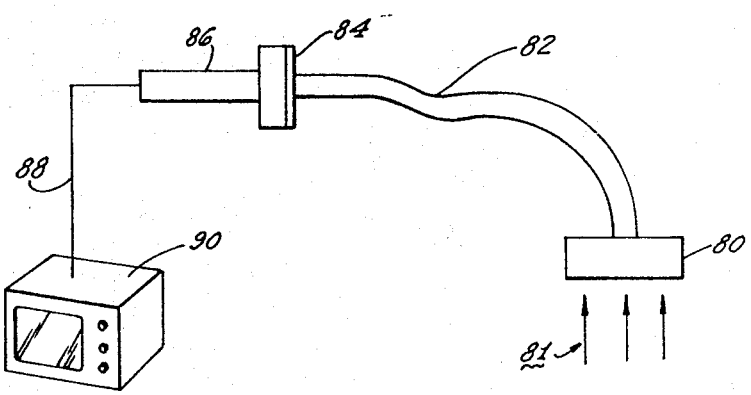
FIGURE 6 is a schematic representation of the invention in its generalized form.

FIGURE 6 shows a schematic representation of an arrangement in accordance with the present invention which may convert any field pattern into a visual representation of the field pattern. As shown therein the detector mosaic 80 is connected by a flexible cable 82 to the face plate 84 of a camera pickup tube 86 similar to that described in FIGURE 2 above. The mosaic of detectors 80 includes one detector for each conductive element in the face plate 84 of camera tube 86, with each detector element being electrically connected by a conductor in cable 82 to its corresponding conductive element in face plate 84. In operation, the mosaic of detectors 80 is placed in the field pattern 81 for which a visual representation is desired. Each detector in the mosaic provides an electrical signal corresponding to the intensity of the field pattern 81 at its particular location and this signal is applied through cable 82 to the conductive elements in face plate 84. As was described above in connection with FIGURE 2, the electron beam of camera tube 86 then scans the interior surface of face plate 84 and the resultant video signal may be applied through a conductor 88 to a conventional television monitor 90 to present a visual representation of the field pattern 81 to which the mosaic of conductors 80 is subjected.

The type of detector element chosen for use in the mosaic 80 depends, of course, on the nature of the field 81 for which a visual representation is desired. For example, if field 81 is an X-ray field, the detectors in mosaic 80 may be scintillators. If the field is a light field, the detectors may be photoconductors or photocells. If the field is an infrared or ultraviolet field, the detectors may be photoconductors or photocells which respond to the particular frequency of the field. If the field is a static electric field, the detectors may simply be probes which directly connect to the conductive elements in face plate 84. Thus it is seen that in the general case the invention may be utilized to provide a visual representation of any field pattern for which detectors exist which can provide an electrical representation of the intensity of the field pattern at a given point.

In a slight modification of the arrangement of FIGURE 6 a visual representation of the temperature of a body could be displayed by providing a plurality of thermocouples instead of the mosaic of detectors 80, with the thermocouples being positioned at predetermined points on the body and having their outputs directly connected to the conductive elements in face plate 84.

It is also observed that in the arrangement shown in FIGURE 6 the field pattern 81 is not necessarily a reflected field from a transmitted wave, such as was shown in the arrangement of FIGURE 1. Instead, the invention may be utilized either in such reflected wave systems or for providing a visual representation of any field pattern regardless of how the field pattern came into being.

It is to be understood that the above described arrangements are illustrative of the application of the principle of the present invention. Numerous other arrangements within the scope of the invention may be devised by those skilled in the art. For example, a two dimensional mosaic of detectors is shown. One dimensional and three dimensional mosaics could be used, if desired. Accordingly, from the foregoing examples, it is evident that various changes may be made in the present invention without departing from the spirit of the invention as defined in the appended claims.

What is claimed is:
1. A cathode ray tube, comprising
   a face plate,
   a mosaic of electrically conductive elements extending through and being embedded in said face plate, each of said conductive elements having an interior portion inside of said cathode ray tube and an exterior portion outside of said cathode ray tube, said mosaic being adapted to having a voltage pattern impressed thereon,
   an electron gun spaced from said face plate for generating an electron beam to scan the interior portion of said conductive elements,
   an electron multiplier positioned adjacent to said electric gun,
   and means for obtaining an output signal from said electron multiplier.

2. The cathode ray tube of claim 1 in which the cross sectional area of the interior portion of each of said conductive elements is substantially larger than the cross sectional area of said conductive elements embedded in said face plate.

3. The device of claim 1 which further includes means for deflecting the electron beam from said electron gun to periodically scan the interior portions of said conductive elements and means for directing any electrons returning from said face plate towards said electron gun into said electron multiplier.

4. A system for obtaining a visual representation of an underwater scene, comprising
   a source of ultrasonic wave energy,
   means for directing ultrasonic wave energy from said source onto the scene for which a visual representation is desired,
   a mosaic of detector elements, each of said detector elements being a transducer for converting ultrasonic wave energy into an electrical signal of corresponding intensity,
   means for focusing ultrasonic wave energy reflected from said scene onto said mosaic of detector elements,
   a cathode ray tube including a face plate and an electron gun, said face plate having a mosaic of conductive elements corresponding to said mosaic of detector elements embedded in and extending through said face plate,
   means for electrically connecting the output signal of each of said detector elements to a respective one of said conductive elements,
   means for causing the electron beam from said electron gun to scan said face plate,
   means responsive to said electron beam for obtaining a video signal indicative of the output signals of said detector elements,
   a television viewing monitor,
   and means for applying said video signal to said television viewing monitor.

5. The system of claim 4 in which said mosaic of detector elements comprises a mosaic of piezoelectric crystals and in which said means for applying the output signal of each of said detector elements to a respective one of said conductive elements includes a corresponding mosaic of transistors, each having an input electrode, a common electrode, and an output electrode, means for applying the output signal of each of said detector elements to the input electrode of a respective one of said transistors, means for electrically connecting each of the common electrodes of said transistors, and means for connecting the output electrode of each of said transistors to a respective one of said conductive elements in the face plate of said cathode ray tube.

6. Apparatus for the production of a video signal indicative of a field pattern for which it is desired to present a visual display comprising
   a cathode ray tube including a face plate;
   a mosaic of conductive elements extending through said face plate, each of said conductive elements having an interior portion inside of said cathode ray tube and an exterior portion outside of said cathode ray tube;
   means for impressing upon the exterior portions of each of said conductive elements a voltage corresponding to the field intensity at a respective predetermined point in said field pattern, said last mentioned means including a mosaic of detector elements in which each detector element corresponds to a respective conductive elements in said mosaic of conductive elements, each of said detector elements comprising a separate electrical generating device for converting the intensity of the field pattern for which a visual display is desired into a corresponding voltage signal; and means for impressing the voltage signal from each of said detector elements onto its corresponding conductive elements;
   means for generating an electron beam within said cathode ray tube and for causing said electron beam to scan the interior portions of said conductive elements; and
   means responsive to said electron beam for generating a video signal indicative of the voltage pattern being impressed upon the exterior ends of said conductive elements.

7. The apparatus of claim 6 which further includes rectification means connected between each of said detector elements and its corresponding conductive element whereby a D.C. potential whose magnitude is proportional to the field intensity at a predetermined point in the field to be displayed is impressed upon the exterior portion of each of said conductive elements.

8. The apparatus of claim 6 which further includes a semiconductive element position between each of said detector elements and its corresponding conductive element for rectifying and ampliifying the electrical signal generated in said detector element whereby a D.C. potential is impressed upon the exterior portion of each said conductive element corresponding to the intensity of the field pattern imposed upon its corresponding detector element.

9. The apparatus of claim 6 in which the field pattern to be displayed in an ultrasonic field pattern and in which each of the detectors in the mosaic of detector elements is a piezoelectrical crystal for converting the ultrasonic field intensity at a given point into an electrical signal of corresponding intensity.

10. The apparatus of claim 6 in which each of said piezoelectric crystals is a truncated pyramid having its larger end exposed to the field pattern and having its smaller end electrically connected to its respective conductive element in said mosaic of conductive elements.

11. The apparatus of claim 6 in which the field pattern to be displayed is an X-ray field pattern and in which each of the detectors in said mosaic of detector elements is a scintillator.

12. The apparatus of claim 6 in which the field pattern to be displayed is an ultraviolet field pattern and in which each of the detectors in said mosaic of detector elements is a photocell responsive to the wavelength of said ultraviolet field.

13. The apparatus of claim 6 in which the field pattern to be displayed is an infrared field pattern and in which each of the detectors of said mosaic of the detector elements is a photocell responsive to the wavelength of said infrared field.

14. The apparatus of claim 6 in which the field pattern to be displayed is a light pattern and in which each of the detectors in said mosaic of detector elements is a photocell.

15. The apparatus of claim 6 in which the field pattern to be displayed is a heat field and in which each of the detectors in said mosaic of detector elements is a thermocouple.

References Cited

UNITED STATES PATENTS

| | | | |
|---|---|---|---|
| 2,013,162 | 9/1935 | McCreary | 313—329 X |
| 2,109,321 | 2/1938 | Schroter | 313—329 X |
| 2,306,272 | 12/1942 | Levy | 178—6.8 |
| 2,528,725 | 11/1950 | Rines | 178—6.8 |
| 2,899,580 | 8/1959 | Dranetz et al. | 313—89 |
| 2,951,175 | 8/1960 | Null | 315—10 |
| 2,957,340 | 10/1960 | Rocha | 73—67.5 |
| 3,021,834 | 2/1962 | Sheldon | 178—6.8 X |
| 3,100,817 | 8/1963 | Rosendahl | 178—7.87 |
| 3,225,240 | 12/1965 | Sybeldon | 313—65 |

FOREIGN PATENTS 688,959  3/1953  Great Britain.

RODNEY D. BENNETT, *Primary Examiner.*

CHESTER L. JUSTUS, *Examiner.*

R. A. FARLEY, *Assistant Examiner.*

UNITED STATES PATENT OFFICE
CERTIFICATE OF CORRECTION

Patent No. 3,325,777  
June 13, 1967

Norman F. Fyler

It is hereby certified that error appears in the above numbered patent requiring correction and that the said Letters Patent should read as corrected below.

Column 9, line 1, for "in", first occurrence, read -- is --; line 3, for "piezoelectrical" read -- piezoelectric --.

Signed and sealed this 30th day of July 1968.

(SEAL)  
Attest:

Edward M. Fletcher, Jr.  
Attesting Officer

EDWARD J. BRENNER  
Commissioner of Patents